Inventor.
Walter J. Podbielniak.

Attorney.

Patented June 4, 1935

2,004,011

UNITED STATES PATENT OFFICE 2,004,011

CENTRIFUGAL COUNTER CURRENT CONTACT APPARATUS

Walter J. Podbielniak, Tulsa, Okla.

Application August 18, 1930, Serial No. 476,190

30 Claims. (Cl. 202—158)

This invention deals with the art of fractional distillation, absorption and otherwise securing counter current contact between fluids, and provides what is regarded as a fundamentally and broadly new apparatus for such purposes, for example, for the fractional distillation, either on a commercial scale or for analytical processes, of fluids having constituents of different boiling points.

In order that the objects and accomplishments of the invention may be most fully and clearly understood, I shall discuss preliminarily some of the problems and difficulties commonly met with in attempting to accomplish the intimate contact necessary for precise or close fractionation; and also mention briefly the short-comings of the usual type of fractionating apparatus which render such apparatus incapable of effecting close fractionation in the distillation of fluids or mixtures having the characteristics hereinafter mentioned. In the commercial or laboratory distillation of liquid mixtures having constituents or fractions of various boiling points, it is frequently desirable, and in many cases essential, to be able to fractionate the mixture with such closeness as to isolate the constituents in substantially their pure state. For example, in the distillation of petroleum crude or other mixtures of similar complexity of composition, it is desirable for numerous reasons to be able to fractionate the crude into constituents ranging in volatility from the lightest to the heaviest, with such closeness or sharpness of separation that the fractions or cuts will consist of the constituents of the mixture in substantially pure conditions, or of compounds which together have a very close boiling range.

In certain of the more efficient types of common fractionating apparatus, fairly close fractionation of the more volatile constituents of a mixture may be brought about. For instance, the highly volatile constituents of natural gas ranging say from methane through the pentane fractions, may be isolated in a fairly pure state by the use of highly efficient and properly designed fractionating columns, particularly in small scale laboratory equipment. However, when it is attempted to separate the fractions or constituents of comparatively higher boiling point and higher molecular weight, whether in petroleum or other complex mixtures, heretofore insurmountable difficulties have been encountered such as prevent precise fractionation and isolation of the higher boiling point constituents, due chiefly to the increasing complexity of isomeric compounds for any given boiling range, and to the extreme closeness in boiling point of many of these heavier constituents. In order to approximate close fractionation of such mixtures by the usual types of fractionating apparatus, extremely high or long fractionating columns are required. However, even these fail to accomplish the separation of the heavier fractions with the desired closeness when such fractions reach the higher boiling ranges and greater complexity of molecular structure. Insofar as I am aware, the separation of the heavier fractions having boiling points within a range of about 6° C., cannot be accomplished by fractionating equipment heretofore employed, whether in laboratory or commercial scale distillation. From an analytical standpoint, it is desirable to determine the exact composition of petroleums and other similar complex mixtures, and to be able to carry the analysis of the mixture composition through the heaviest constituents which it may contain.

It is a primary object of this invention to provide an apparatus for securing the highly effective and intimate contact required for fractional distillation that will enable all volatile mixtures to be separated into their pure constituents, or single compounds, or into fractions having an extremely close boiling point range which may be as low as say 1° or less. And the invention is intended to provide further an apparatus adapted to accomplish such close fractionation without the requirement for large and complicated equipment.

In order to attain precise fractionation of the heavier and more complex fractions of, for example, petroleum crudes by ordinary apparatus, there would be required a fractionating column of unreasonably and impractically great length or height. The reason for this will be readily understood by those familiar with the art, since the commonly understood theory of fractional distillation involves the idea that the degree of closeness with which any two fractions may be separated, will depend upon the intimacy and time of contact between the liquid and gaseous phases. An ideal column which would accomplish perfect separation between the constituents of a mixture, would be one of infinite length, of infinitesimal diameter, and one which holds at any one time an infinitesimal quantity of liquid and vapor. Although the theoretical requirement of infinitesimal liquid or vapor holdup is of primary importance in batch distillation, since the quantitative separation of complex mixtures is carried out in batch distillation, in any case minimum liquid and vapor holdup is a practical advantage in decreasing the size of the equipment and amount of desirable constituent held up.

Aside from practical considerations of difficulty, inconvenience, and expense involved in constructing fractionating columns of length substantially greater than those now in use, such construction is made impossible due to the fact that in the usual fractionating column gravity is relied upon to cause the liquid or reflux to flow downward and counter-currently to the ascending vapor within the column. By so relying upon gravity to cause the flow of the reflux liquid, the usual fractionating column must of course be built vertical and designed and given such dimensions that the vapor will not hold up the liquid flow or cause the liquid to be entrained in or carried by the vapor stream. It necessarily follows then that the vapor velocity must be held within certain comparatively low limits by building the columns with correspondingly large diameters, in order that the vapor velocity will not become so high that the reflux liquid is carried with the vapors, thereby resulting in priming or flooding of the column. I may also state that sufficient clearance or spacing between the plates of the column must be allowed in order to avoid priming, and in many cases the factor of clearance alone may necessitate building a fractionating column of very great length.

Because heretofore gravity has been resorted to as a means for bringing about countercurrent flow of the reflux liquid with the vapor, a limit has been reached of the efficiency which such apparatus may have, and although the advantages of building columns of much greater lengths has been well appreciated, the impracticability from engineering and economical standpoints have prevented such constructions. Accordingly the efficiency of the apparatus has been limited by the practical consideration involved.

The present invention departs from the usual apparatus for securing the intimate contact necessary for fractional distillation in the utilization and adaptation of a different force to bring about countercurrent flow and contact of the vapors and the reflux liquid. Instead of causing the reflux to flow by gravity, I bring about countercurrent flow of the reflux by centrifugal force, taking advantage of the difference in specific gravity of the reflux and the vapor. By the aid of centrifugal force, the reflux may be caused to flow at a high rate through a fractionating column or tube of small diameter, thereby reducing the amount of liquid and vapor held in the column to a minimum, and without interference in the flow of the reflux by the vapors, since by virtue of the differences in specific gravities of the two fluids, they are caused to follow separate and non-interfering paths. Also the centrifugal force may be made to overcome very much greater "interferences" or pressure drops which normally would occur than would be possible with gravity alone. By so employing centrifugal force, the fractionating column or tube may be built or mounted in the form of a coil, tube or channel of increasing diameter, thereby enabling the entire column to be built in an extremely compact form, and to be of practically any desired length without involving prohibitive constructions. A close approach to the ideal column characterized hereinabove is therefore made possible by the invention in that the column may be made of great length and capable of great capacities since the reflux and vapor may be put through the column at high rates regardless of the column diameter, to the end that a far greater efficiency is attained in bringing about close fractionation than can possibly be attained by fractionating equipment heretofore used.

It is to be distinctly understood that the invention broadly contemplates the use of centrifugal force in effecting intimate and extended contact of heavier and lighter fluids, such as a liquid with a gas or vapor in a variety of situations in which the object of the operation is to bring about contact between the fluid phases. For example, instead of subjecting a liquid and gas or vapor to this action for the purpose of fractionating the constituents thereof, the present apparatus may be employed for effecting vaporization of fairly volatile constituents of the liquid, or for loading the liquid with or causing to be absorbed therein certain constituents of the vapors. This latter procedure will be readily recognized as that followed in absorption systems wherein an absorbing liquid, by virtue of extended and intimate contact with a vapor or gas, is caused to hold or absorb certain desirable fractions in the gas which are subsequently recovered by separation from the absorbing liquid.

For purposes of describing the invention, I show herein a type of construction which may be considered as a preferred embodiment of the invention. However, it will be understood that the invention in its broader aspects is in no way to be regarded as limited to the particular construction shown herein since, as I have stated, the hereinafter described form of the invention is but typical of a variety of constructions that may come within the spirit and scope of the invention.

My preferred embodiment of the invention may be characterized as comprising a tube or conveying channel in spirally coiled form carried on a rotatable body or support. Vapors are fed to the tube, and reflux is returned to the tube, through stationary inlet and outlet lines. Fluid tight stuffing boxes or joints are provided between the rotatable tube and the stationary inlet and outlet, and although in the broader aspects of the invention any suitable type of fluid tight connection may be provided between the column and the inlet and outlet, I prefer, for reasons that will be made apparent hereinafter, to employ liquid seal joints in which mercury, preferably, is used as the sealing medium. The connections between the tube and the vapor supply source, and the outlet and reflux condenser are such as to permit heavier fractions not vaporized in the tube to be returned through the inlet to the vapor supply source or still, and the condensate from the reflux condenser to be returned through the outlet to the tube.

The above mentioned objects and aspects of the invention, as well as the various features of a preferred embodiment suitable for use in fractional distillation thereof, will be understood from the following detailed description, reference being had throughout the description to the accompanying drawings, in which:

Fig. 3 is a reduced sectional view on line 3—3 of Fig. 2.

Figure 1:
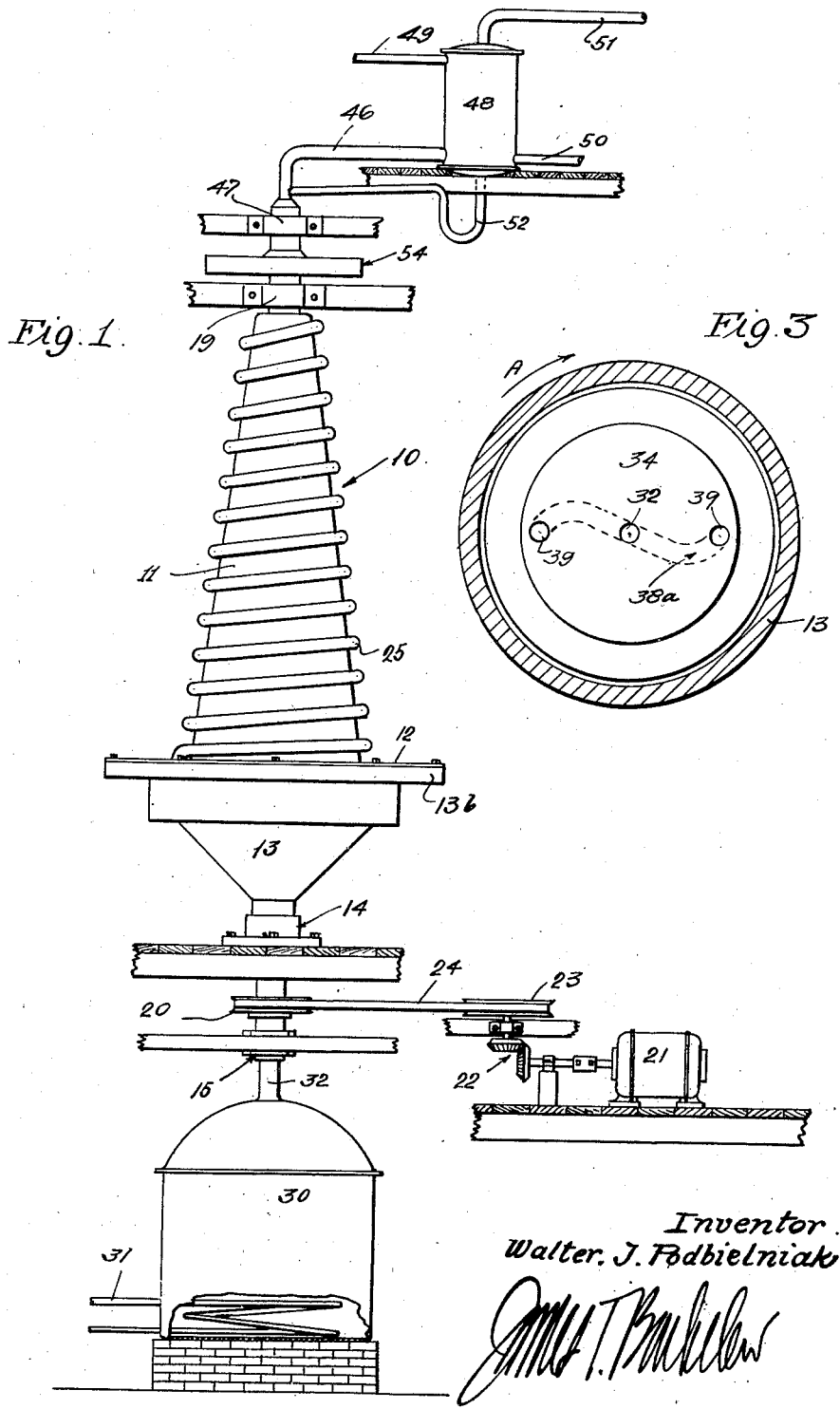
Fig. 1 is a general view, diagrammatic in parts, illustrating a typical embodiment of the invention, the showing of the insulating layer about the fractionating tube coil being omitted for purposes of more clearly illustrating the arrangement and mounting of the tube.
Figure 2:
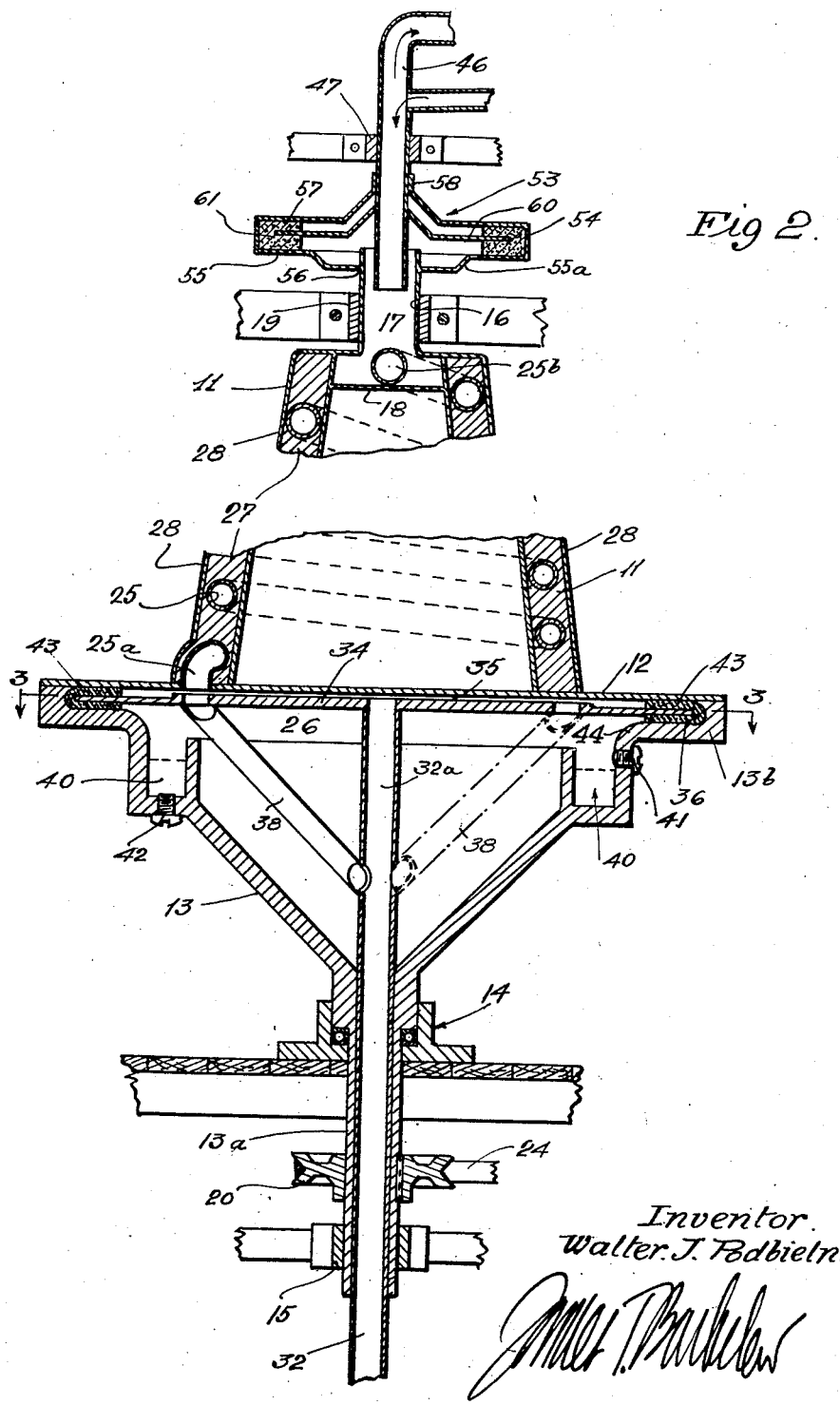
Fig. 2 is an enlarged, vertically contracted sectional view taken through the fractionating apparatus.

Referring first to Figs. 1 and 2, numeral 10 denotes generally the centrifugal fractionating apparatus which comprises a rotatable mounting or body 11 comprising a vertical shell, which may suitably, though not necessarily, be of conical shape as indicated, or at any rate so designed that both liquid and vapor throughout the bulk of the coil length are continually forced along the desired directions through centrifugal force. It will be understood that the fractionating tube supporting means or body may be of various constructions and shapes and that the fractionating tube, hereinafter described, may accordingly be arranged in a variety of manners. The shell 11 is supported on a circular bottom plate 12 which in turn rests on a circular hollow and downwardly tapering base 13, which, as will be apparent, may conveniently be made as a single casting. The lower reduced tubular portion 13a of the base is journaled in suitable bearings, conventionally indicated at 14 and 15, bearing 14 serving as a vertical support for the rotating parts. Shell 11 has at its upper end a tubular extension 16 which provides an inner chamber 17 closed at its lower end by plate 18. Tubular extension 16 is journaled in a suitable bearing 19. It will be apparent that various mechanical arrangements may be provided for supporting and journaling the fractionating tube supporting structure at its upper and lower ends, the bearing arrangement shown in the drawings being intended as typical only. The described supporting structure may be rotated by any suitable drive means, and as typical I have shown a pulley 20 keyed to the lower tubular portion 13a of the base and driven from motor 21 by way of gears 22, pulley 23 and belt 24.

Mounted on the supporting structure exteriorly of shell 11 is a spirally wound tube or "column" 25, which opens at its lower end 25a through the bottom plate 12 into the interior 26 of the base 13, and at its upper end at 25b through the wall of shell 11 into chamber 17. It will be understood that although for purposes of illustration I show a contacting or fractionating tube coil having a comparatively few number of turns, the apparatus may be built so as to accommodate a coil of very great length and consisting of a correspondingly great number of turns. In order to maintain the proper temperature and equilibrium conditions in the tube, the coil preferably will be thermally insulated with a layer 27, see Fig. 2, of suitable thermal insulating material, and since during operations the coil may be revolved at a high rate of speed, the insulation may best be protected by enclosing it within a suitable sheath 28. It may be stated at this point that the tube diameter may be but a fraction of the diameter required for the usual column capable of corresponding through-put, because of the effect of centrifugal action in maintaining the fluids in separate paths of flow, as will more fully appear hereinafter.

Heated vapors to be subjected to rectification and fractionation in the spiral tube or column may be taken from any suitable source, and as a typical form of evaporator, I show in Fig. 1 a still 30 containing the liquid mixture to be fractionated, for example, a petroleum crude, the liquid being heated and evaporated in the still by means of steam coil 31. The vapors are conducted from the still 30 through line 32 which extends upwardly through the lower sleeve portion 13a of the rotatable base 13 to a point somewhat below plate 12. Pipe 32 may be regarded as a stationary vapor inlet to the fractionating apparatus. In order to prevent fluid leakage from the interior space 26 within base 13 around the inlet pipe 32 at such times as the liquid seal between the fractionating tube and pipe 32 may be ineffective, the pipe may be caused to fit more or less snugly within the elongated sleeve 13a.

Carried on the upper end of pipe 32 is a circular plate or vane 34 which is spaced at 35 a suitable distance from plate 12. The outer portion of vane 34 projects within an annular liquid seal chamber or recess 36 formed between plate 12 and the upper flanged portion 13b of the base. A suitable number of pipes or conduits 38, two being shown as typical, extend from pipe 32 at a suitable distance below its upper end, to openings 39 located in plate 34 a radial distance from the center thereof corresponding to the radial distance of the lower open end 25a of the fractionating tube. Assuming the tubular coil to be rotated in the direction indicated by arrow A in Fig. 3, tubes 38 preferably will be given at their upper ends a curvature as indicated at 38a, so that the tubes will extend substantially in line with the diagonally downward path in which the liquid discharged from the lower end of the fractionating tube will tend to follow due to the rotation of the tube.

Within base 13 and directly below flange 13b is an annular trough 40 which, when the apparatus is stationary, contains a suitable sealing fluid, preferably mercury. Filling and drain plugs 41 and 42 are provided in the side and bottom respectively of the mercury trough. As the apparatus is rotated, the mercury within trough 40 is caused by centrifugal action to rise along the outer wall of the trough, and when the apparatus is rotated at operating speed, the mercury will be displaced from the trough into the annular seal chamber 36 to the position indicated at 43. Preferably the outer wall of the trough will be curved as at 44 in order to permit smooth flow of the mercury into the sealing chamber.

I may state at this point that the provision of a mercury seal joint of the character shown between the stationary inlet pipe 32 and the rotating fractionating tube is of particular advantage in that the parts of the seal are entirely free from wear, as distinguished from the usual type of stuffing box within which a compressed packing is used. Also it will be noted that due to the great centrifugal force holding the mercury in the liquid seal chamber, the mercury will not become displaced to one side of the sealing vane 34 to such an extent as to permit passage of other fluids through the sealing liquid even by extremely high differential pressure at opposite sides of the vane.

The vapors passing out of the upper end of the fractionating tube into the chamber 17 are conducted through a stationary outlet line 46, supported by bracket 47, to the reflux condenser 48, wherein the heavier fractions of the vapors may be condensed by a suitable cooling fluid introduced to the condenser through line 49 and discharged through line 50. The uncondensed vapors from the reflux condenser are conducted through line 51 to suitable condensing means, not shown. The reflux condensate from the condenser 48 is returned through line 52 to the vapor outlet line 46, from whence the reflux passes into chamber 17 and into the fractionating tube.

A mercury seal, generally indicated at 53 and similar in principle to the hereinabove described lower seal, is provided between the upper rotating extension 16 of the supporting structure and the stationary outlet pipe 46. The seal 53 comprises a hollow housing 54 consisting of a lower plate 55 joined at 56 to tubular portion 16, and an upper plate 57 having a reduced diameter sleeve portion 58 which may be fitted more closely to pipe 46 in order to close off the escape of any vapors that may be in the housing at such times as the mercury seal may be broken. Mounted on the outlet pipe is a circular plate or vane 60 which forms a barrier between opposite sides of the mercury seal in the same manner as the lower vane 34. The bottom 55 of housing 54 may be cupped as at 55a in order to accommodate sufficient mercury to effect the seal. Upon rotation of the housing to operating speed, the mercury rises to the position indicated at 61, thereby sealing between the spaces within the housing above and below the vane, and causing the flow of vapors from chamber 17 to pass into the outlet line.

In the operation of the apparatus, the vapors from still 30 pass upwardly through the stationary pipe 32, the major portion of the vapors flowing through the upper portion 32a of the inlet into space 35, although some of the vapors may be conducted into that space through the conduits 38. The vapors then pass into the lower end 25a of the fractionating tube and upwardly through the tube into chamber 17 and the outlet line 46 leading to the reflux condenser. As previously stated, the reflux is returned through the outlet to chamber 17, from whence it flows outwardly through the fractionating tube and countercurrently to the ascending vapors, into space 35. Due to its greater specific gravity, the reflux liquid in space 35 is maintained at the outside of the opening 25a so as not to interfere with the flow of vapors into the fractionating tube. Liquid in space 35 passes downwardly through conduits 38 and line 32 to the evaporator.

The countercurrently flowing reflux and vapors in the fractionating tube, due to the action of the centrifugal force thereon, will of course be caused to flow in separate paths, the reflux, by virtue of its higher specific gravity, being caused to flow along the outside interior wall of the tube, and the vapors to follow a path at the inside of the reflux. Thus the two fluids are maintained in non-interfering paths of flow with the result that a high rate of flow through the tube may be obtained without causing priming, or in other words without causing reflux liquid to be picked up and carried by the vapor stream. And although the liquid and vapors follow separate paths, it will be noted that the two are maintained in intimate and extended exposure since the inner surface of the liquid stream is in direct contact with the vapors. A further advantageous result is brought about by the centrifugal action in that there is a tendency for the heavier constituents of the vapors to be thrown to the outward section of the vapor stream in contact with the reflux, so that the heaviest constituents of the vapors will be maintained in the most intimate contact with the reflux, the effectiveness of which in bringing about the greatest fractionating efficiency will be readily apparent to those familiar with the theories of fractionation by rectification. And I may state that it is likewise true that the lightest of the liquid components will tend to be brought to the liquid vapor surface, to obvious advantage. The most advantageous speed of rotation of the column may vary, but I may state that satisfactory results have been attained revolving the column at a rate of about 4000 R. P. M.

Since the reflux and vapors are maintained in non-interfering paths of flow, it follows that the column or fractionating tube may be of practically any length desired, since increasing the length of the tube will in no way act to retard the free countercurrent passage of the liquid and vapor. And for similar reasons it will be apparent that the tube or column may be of greatly reduced diameter, even though the velocities of the liquid and vapors passing therethrough are high, since no interference will occur which will occasion priming as the result of high velocity.

By proper control of the reflux, the composition of the vapors passing through the outlet line 51 to suitable final condensers may be controlled so that the condensate will consist, if desired, of one constituent of the mixture being evaporated, and in substantially its pure state; or the condensate may consist of an extremely close cut fraction, the boiling range of which may be as low as within 1° C. or less. The heavier liquid constituents returned from the fractionating tube to the still may be revaporized and the various fractions or constituents subsequently obtained as final condensate in the order of their decreasing volatility, as separation of the mixture constituents proceeds. The efficiency of the apparatus is such that distillation curves plotted to represent the range through which distillation is carried, will indicate, in the case of separation of constituents comprising single compounds, successive condensates each of substantially constant boiling point and between which a well defined change in boiling point will appear. And in the separation of constituents having a predetermined boiling range, the fractional condensates will be found to conform substantially to such boiling range, without overlapping between the successive cuts.

While I have described and illustrated an embodiment of my invention as applied to fractionating vapors derived from distilling complex liquids such as crude petroleum, it will be understood that I do not limit myself to the details thereof nor to any particular field of application of the apparatus which may be utilized to secure counter current contact between fluids of different density and at least partially immiscible with each other.

I claim:—

1. Apparatus of the character described comprising, a rotatable fractionating tube, means for passing vapors through said tube, means for passing reflux liquid through said tube countercurrently to the vapors, and means for rotating said tube so as to exert centrifugal force on the fluid thereby and cause the liquid and vapors to flow in separate paths.

2. Apparatus of the character described comprising, a rotatable fractionating tube, a still, means for introducing vapors from said still to one end of the fractionating tube, a reflux condenser, means for conducting condensate from said reflux condenser to the opposite end of said tube, and means for rotating the fractionating tube so as to exert centrifugal force on the fluid therein and cause the reflux liquid and vapors to flow in separate paths.

3. Apparatus of the character described comprising, a rotatable fractionating tube, a relatively stationary inlet through which vapors are introduced to the fractionating tube, a stationary outlet, means providing fluid tight seals between said tube and the inlet and outlet, and means for rotating the fractionating tube to exert centrifugal force on the fluid therein.

4. Apparatus of the character described comprising, a rotatable fractionating tube, a relatively stationary inlet through which vapors are introduced to the fractionating tube, a stationary outlet, means providing liquid seals between said tube and the inlet and outlet, and means for rotating the fractionating tube to exert centrifugal force on the fluid therein.

5. In apparatus of the character described, a rotatable conduit member, a relatively stationary inlet member and sealing means comprising an outer casing connected to and rotatable with the conduit member, said casing having a recess forming an annular chamber and means for supplying sealing liquid thereto, whereby the sealing liquid is retained in said recess on rotation by centrifugal force, and a stationary sealing member connected to the inlet member and extending into the recess and into the sealing liquid therein.

6. Apparatus of the character described comprising, a rotatable fractionating tube, a relatively stationary inlet, liquid seal means between said rotatable tube and the inlet, and means for rotating the fractionating tube.

7. Apparatus of the character described comprising, a fractionating tube, means for passing vapors through said tube, a rotatable mounting for the fractionating tube, and means for rotating said mounting and the fractionating tube.

8. Apparatus of the character described comprising, a fractionating tube, a rotatable mounting for the fractionating tube, means for rotating said mounting and the fractionating tube, a relatively stationary inlet for said fractionating tube, a stationary outlet, and fluid tight joints between said tube and the inlet and outlet.

9. Apparatus of the character described comprising, a fractionating tube, a rotatable mounting for the fractionating tube, means for rotating said mounting and the fractionating tube, a relatively stationary inlet for said fractionating tube, a stationary outlet, and liquid seal fluid tight joints between said tube and the inlet and outlet.

10. Apparatus of the character described comprising, a coiled fractionating tube, means for introducing fluid to be fractionated into said tube, and means for rotating said tube so as to exert centrifugal force on the fluid therein.

11. Apparatus of the character described comprising, a spirally coiled fractionating tube, means for introducing fluid to be fractionated into said tube, and means for rotating said tube so as to exert centrifugal force on the fluid therein.

12. Apparatus of the character described comprising, a rotatable coiled fractionating tube, a relatively stationary inlet through which vapors are introduced to the fractionating tube, a stationary outlet, means providing fluid tight seals between said tube and the inlet and outlet, and means for rotating the fractionating tube to exert centrifugal force on the fluid therein.

13. Apparatus of the character described comprising, a coiled fractionating tube, means for passing vapors through said tube, a rotatable mounting for the fractionating tube, and means for rotating said mounting and the coiled fractionating tube.

14. Apparatus of the character described comprising, a coiled fractionating tube, a rotatable mounting for the fractionating tube, means for rotating said mounting and the fractionating tube, a relatively stationary inlet for said fractionating tube, a stationary outlet, and fluid tight joints between said tube and the inlet and outlet.

15. Apparatus of the character described comprising, a vertically extending rotatable body, a coiled fractionating tube extending around and carried on said body, a stationary inlet and outlet for said fractionating tube, means for rotating said body and the fractionating tube, and fluid tight joints between the fractionating tube and said inlet and outlet.

16. Apparatus of the character described comprising, a vertically tapered rotatable body, a spirally coiled fractionating tube extending around and carried on said body, a stationary inlet and outlet for said fractionating tube, means for rotating said body and the fractionating tube, and fluid tight joints between the fractionating tube and said inlet and outlet.

17. Apparatus of the character described comprising, a vertically extending rotatable body, a coiled fractionating tube extending around and carried on said body, a stationary vapor inlet at the lower end of said coil, a stationary reflux inlet at the upper end of the coil, liquid seal fluid tight joints between the fractionating tube and said inlet and outlet, and means for rotating said body and the fractionating tube.

18. Apparatus of the character described comprising, a conical rotatable body, a fractionating tube coiled into a spiral helix extending around and carried on said body, a stationary vapor inlet at the lower end of said coil, a stationary reflux inlet at the upper end of the coil, liquid seal fluid tight joints between the fractionating tube and said inlet and outlet, and means for rotating said body and the fractionating column.

19. Apparatus of the character described comprising, a tube formed as a curve of progressively increasing radius, means for introducing liquid into said tube, means for supplying a lighter fluid to the outer end of said tube and forcing it therethrough, and means for rotating the tube, thereby forcing said liquid to travel outwardly therethrough.

20. Apparatus of the character described comprising a fractionating tube formed as a curve of progressively increasing radius, means for introducing heated vapors to be fractionated into the outer end of said tube and forcing them therethrough, means for supplying reflux within the tube, and means for rotating the tube, thereby causing the reflux to travel outwardly therethrough.

21. Apparatus of the character described comprising a fractionating tube formed as a curve of progressively increasing radius, means for passing vapors inwardly through said tube, means for passing cooling liquid from a source outside of the fractionating tube into the tube at the inner end thereof, and means for rotating the tube, thereby forcing cooling liquid and reflux to travel outwardly therethrough countercurrently to the vapors.

22. Apparatus of the character described comprising a fractionating tube formed as a curve of progressively increasing radius, a still, means for introducing vapors from said still to the outer end of the fractionating tube, a reflux condenser, means for conducting condensate from finally condensed vapors from said reflux condenser to the inner end of said tube, and means for rotating the fractionating tube thereby causing the reflux liquid and vapors therein to flow in countercurrent paths.

23. In an apparatus of the type described, a rotary drum having a spiral surface therein with its convolutions spaced to form a closed spiral channel, means for admitting material to be treated into the drum at one end portion so as to contact therewith and be conveyed by said surface therealong in layers or films not obstructing said channel when the drum is rotated, whereby gases and vapors may be permitted to pass between the convolutions of said surface, means for subjecting the material in said channel to a treating medium, and means for taking off gases and vapors from said channel in a counter current direction to the movement of the conveyed material being treated.

24. In an apparatus of the type described, a rotary drum having a spiral surface thereon with its convolutions spaced to form a closed spiral channel opened only at its end portions, means for admitting material to be treated into one end portion of said drum so as to be conveyed by said surface therealong in layers or films not obstructing said channel when the drum is rotated, whereby the residue from the treatment may be discharged at the other end of the channel and the gases and vapors may be permitted to pass between the convolutions of said surface, means whereby the treating medium may be introduced into said spiral channel at the material discharge end thereof, and means for taking off the gases and vapors from said channel at or near the material intake end of the channel, whereby the treating medium and any other gases or vapors are caused to move in said channel in a counter current direction to the movement of the material being treated.

25. In apparatus of the character described, a spirally coiled, laterally closed conduit, means for rotating said conduit around the axis of the spiral to exert centrifugal force on fluid therein; means for supplying a fluid within the conduit to pass outwardly therethrough in the direction of increasing diameter by centrifugal action, and means for supplying a lighter fluid to the outer end of the conduit under such pressure as to force it to pass therethrough counter current to the flow of said first-mentioned fluid.

26. In apparatus of the character described, a spirally coiled, laterally closed conduit, a second conduit extending axially of the coil and communicating with the inner end thereof, means for rotating the spirally coiled conduit and the axial conduit and means for supplying fluid to the outer end of the coil under pressure sufficient to force it therethrough.

27. In apparatus of the character described, a spirally coiled, laterally closed conduit, a conduit extending axially of the coil and connected with the inner end thereof, means for rotating the spirally coiled conduit and the axial conduit to develop centrifugal forces within said spiral conduit, means for supplying fluid to the outer end of the spiral conduit and forcing it to pass therethrough to the inner end of the spirally coiled conduit, and means for supplying heavier fluid and withdrawing lighter fluid through said axially extending conduit.

28. In apparatus of the character described, a spirally coiled conduit, a conduit disposed axially of said coil and communicating with the inner end thereof, a conduit disposed axially of said coil and communicating with the outer end thereof, means for rotating the coil and said first mentioned conduit, means for supplying lighter fluid to the last-mentioned axial conduit to pass therethrough into the outer end of the spiral tube coil and to receive therefrom heavier fluid discharged from the coil, and means for supplying heavier fluid to the first-mentioned axially extending conduit to pass therethrough to the inner end of the spiral tube coil and for withdrawing lighter fluid therefrom.

29. In apparatus of the character described, a spirally coiled conduit, means communicating with the inner end of said conduit for withdrawing fluid therefrom, means for rotating said coiled conduit to exert centrifugal force upon fluids contained therein and to force heavier fluids outwardly therethrough, and means communicating with the outer end of said conduit for supplying lighter fluid thereto or withdrawing heavier fluid therefrom, said means comprising an annular liquid retaining member and a circular sealing member entering said annular liquid retaining member, said liquid retaining member and sealing member being relatively rotatable and said sealing member being provided with an opening, and a conduit communicating with said opening.

30. In apparatus of the class described, a spirally coiled conduit and means for rotating the same, a casing rotatable with said conduit into which the outer end of said conduit opens, said casing being provided with a liquid retaining annular recess, a circular sealing member entering said annular recess and providing a space within said casing into which the outer end of the coiled conduit opens, said sealing member being stationary relatively to said casing and being provided with openings, and means providing fluid communication with said openings for supply of fluid to or removal of fluid from the outer end of said coiled conduit.

WALTER J. PODBIELNIAK.